(12) United States Patent
Gu et al.

(10) Patent No.: US 8,213,470 B2
(45) Date of Patent: Jul. 3, 2012

(54) INTRA-CAVITY FREQUENCY DOUBLED MICROCHIP LASER OPERATING IN $TEM_{00}$ TRANSVERSE MODE

(75) Inventors: Shijie Gu, Sunnyvale, CA (US); Jianyang Yang, Fujian (CN); Tyler You, Fujian (CN); Charlie Lu, Fujian (CN); Guanglei Ding, Fujian (CN)

(73) Assignee: Photop Technologies, Inc., Fuzhou (CN)

( * ) Notice: Subject to any disclaimer, the term of this patent is extended or adjusted under 35 U.S.C. 154(b) by 0 days.

(21) Appl. No.: 12/953,827

(22) Filed: Nov. 24, 2010

(65) Prior Publication Data

US 2012/0128014 A1 May 24, 2012

(51) Int. Cl.
*H01S 3/10* (2006.01)

(52) U.S. Cl. ........ 372/22; 372/41; 372/43.01; 372/50.1; 372/72

(58) Field of Classification Search ...................... 372/22
See application file for complete search history.

(56) References Cited

U.S. PATENT DOCUMENTS

| | | | |
|---|---|---|---|
| 5,164,954 A | | 11/1992 | Su |
| 5,412,673 A | | 5/1995 | Caprara |
| 5,459,337 A | * | 10/1995 | Ito et al. ........................... 257/89 |
| 5,657,341 A | | 8/1997 | Hyuga |
| 5,751,751 A | * | 5/1998 | Hargis et al. ..................... 372/41 |
| RE35,962 E | | 11/1998 | Ball |
| 6,324,191 B1 | | 11/2001 | Horvath |
| 6,584,129 B2 | | 6/2003 | Hyuga |
| 7,382,812 B2 | | 6/2008 | Irikuchi |
| 2004/0188680 A1 | * | 9/2004 | Nakajima et al. ................ 257/53 |
| 2006/0097259 A1 | * | 5/2006 | Suezaki et al. ................... 257/66 |
| 2008/0240186 A1 | * | 10/2008 | Liu .................. 372/40 |
| 2008/0289366 A1 | * | 11/2008 | Suzuki et al. ................... 65/386 |
| 2010/0074280 A1 | * | 3/2010 | Ma et al. .......................... 372/19 |

* cited by examiner

*Primary Examiner* — Jessica Stultz
*Assistant Examiner* — Xinning Niu
(74) *Attorney, Agent, or Firm* — SV Patent Service

(57) ABSTRACT

A method for making a microchip laser includes preparing a laser-cavity chip assembly comprising a gain media, a first substantially flat surface, and a second substantially flat surface parallel to the first substantially flat surface. The method also includes forming a first reflective film on the first substantially flat surface to form a first cavity mirror, forming a second reflective film on the second substantially flat surface to form a second cavity mirror, and patterning at least one of the first reflective film or the second reflective film by removing at least a portion of the reflective film in the outer portion to form a center reflective portion in the one of the first reflective film or the second reflective film. The first cavity mirror and the second cavity mirror can suppress higher order transverse modes and produce a single $TEM_{00}$ mode in the lasing light.

22 Claims, 8 Drawing Sheets

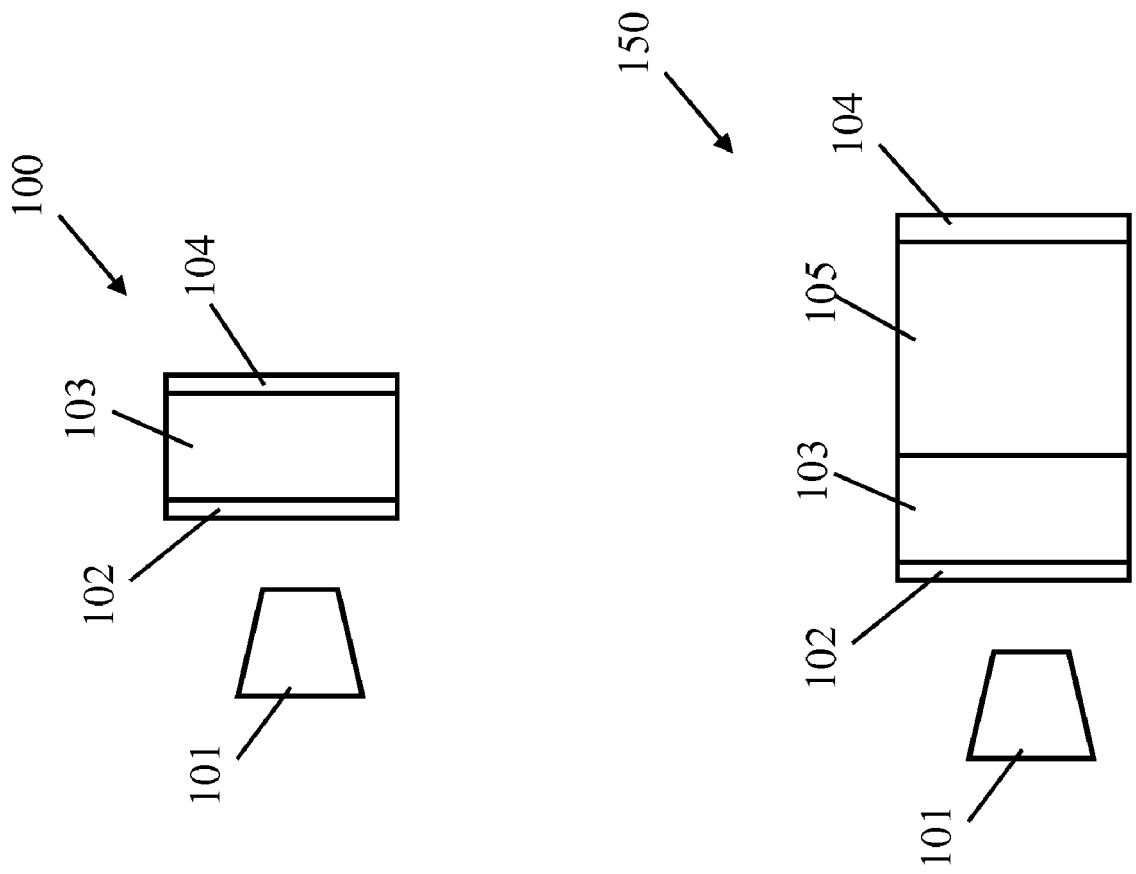

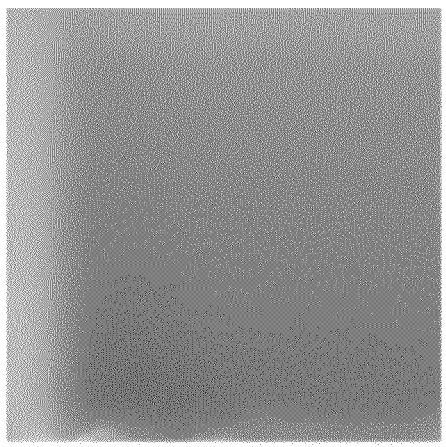
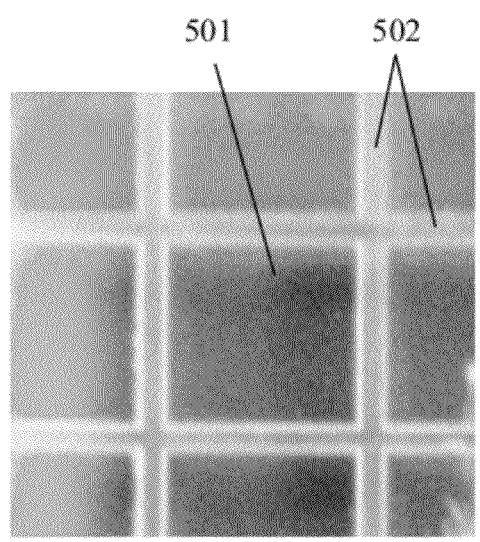
Fig. 5A
Fig. 5B

INTRA-CAVITY FREQUENCY DOUBLED MICROCHIP LASER OPERATING IN $TEM_{00}$ TRANSVERSE MODE

BACKGROUND OF THE INVENTION

The present application relates to microchip laser devices.

Microchip lasers are miniature diode-pumped solid-state devices formed by dielectrically coating thin platelets of gain media. Microchip lasers have continuous wave output characteristics that are comparable to those of the best other types of solid state devices. A microchip laser 100, in its simplest implementation as shown in FIG. 1A, consists of a small piece of solid-state gain material 103 having two polished, flat parallel surfaces at the ends. Cavity mirrors 102,104 are dielectrically deposited onto the polished surfaces. In operation, the microchip laser 100 is longitudinally pumped with a diode laser 101. An important aspect of microchip lasers is that their end surfaces are flat, which can be accomplished by polishing and coating a large wafer (e.g. 3 inch wide) before the wafer is cut into small pieces (e.g. 1 mm square pieces) each forming a microchip laser. The fabrication simplicity and small sizes allow microchip lasers to be mass produced at low cost.

Microchip laser typically have their fundamental frequencies in the IR range. However, many applications, such as displays, biomedical instrumentation, and higher density optical storage systems, require laser output in the visible range. Intra-cavity frequency-doubled microchip lasers can produce laser beams in the blue, green, and red wavelength ranges. A frequency-doubled microchip laser 150, shown in FIG. 1B, can include a gain material 103 formed by Nd:YVO4 and a frequency doubling material 105 formed by KTP which are bonded together to form the laser cavity. The gain material 103 and the frequency doubling material 105 both have polished and parallel surfaces. The outer surfaces are coated by highly reflective films to form cavity mirrors 102,104. The cavity mirrors 102,104 reflect light at the 1064 nm fundamental wavelength. When the frequency-doubled microchip laser 150 is pumped by a laser diode 101, a strong circulating field is built up at 1064 nm. The cavity mode diameter is small, which results in a high circulating intensity. As the fundamental field passes through the frequency doubling material 105, a significant amount is converted to the second harmonic at the visible wavelength of 532 nm.

FIG. 1C shows a low-noise microchip laser device 180 that includes a gain material 103 and a frequency doubling material 105 which are bonded together and a quarter-wave plate 106 for the fundamental wavelength is inserted in the cavity between the mirror 104 and the frequency doubling material 105. When the frequency-doubled microchip laser 180 is pumped by a laser diode 101, a strong circulating field is built up at the fundamental frequency. As the fundamental field passes through the frequency doubling material 105, a portion of it is converted to the second harmonic at the doubling frequency. The fast axis of quarter-wave plate 106 and the optical axis of the frequency doubling material 105 can be set up at 45° relative to each other. The instability caused by the coupling of two polarization modes was effectively suppressed, yielding green output with low noise.

FIGS. 2A-2C show examples of far-field patterns formed by green laser beams of a microchip laser device. In FIG. 2A, a laser beam in $TEM_{00}$ mode produces approximately a circular pattern. FIG. 2B shows the far-field pattern formed by a laser beam including both $TEM_{00}$ mode and $TEM_{01}$ mode. FIG. 2C illustrates the far-field pattern formed by a laser beam comprising $TEM_{00}$ mode, $TEM_{01}$ mode and $TEM_{02}$ mode.

A laser beam in diffraction-limited $TEM_{00}$ transverse mode showing compact circular beam spot pattern (as shown in FIG. 2A) is desirable for most applications of microchip lasers. However, due to the inherent characteristics of microchip lasers and especially the intra-cavity frequency-doubled microchip lasers, high-order transverse modes commonly appear in most microchip laser devices.

Microchip lasers have flat-flat cavities and plane waves in their eigen modes. Optical pumping creates heat in the microchip lasers. If the refractive index of the gain media increases with temperature (e.g. as in the case of Nd:YVO4), a waveguide can be formed. In addition, thermal expansion of the gain medium can result in end-face curvature. The end-face curvature can also result in a stable cavity mode. For these reasons, thermal effects can be beneficial in defining a stable cavity. On the other hand, thermal effects also limit the performance of the microchip lasers. One important advantage of the microchip lasers is that they form self-aligning, stable cavities in contrast to other solid-state lasers that require careful alignment of cavity mirrors. This advantageous feature, however, is affected by the thermal effects at low and high average pump powers. At low pump power (and low output power), the resonance cavity is poorly defined because low heat creation produces small thermal lensing effect. The microchip lasers operate in multi-transverse modes. The thermal effects can cause the operations of microchip lasers to be highly sensitive to temperature; microchip lasers often can operate in $TEM_{00}$ mode only in narrow temperature ranges.

Furthermore, intra-cavity frequency-doubled lasers can be more prone to multi-transverse modes than conventional output coupling. Some researchers indicated "small amount of unextracted pump energy outside the $1/e^2$ radius of the $TEM_{00}$ beam is usually not enough to support higher order modes. However, the nonlinear gain saturation of the intra-cavity frequency-doubled laser combined with the poor spatial overlap of the transverse modes increases the gain and reduces the nonlinear losses for the higher order modes." (Anthon et al., J. Quantum Electronics, 28, 1148, 1992)

In intra-cavity frequency-doubled microchip lasers, the conversion efficacy of second harmonic is very high; this efficacy for $TEM_{00}$ mode fundamental wave is much higher than that of higher order mode fundamental waves. As a result, nonlinear loss for the $TEM_{00}$ mode is much larger than nonlinear losses for higher order mode, which makes the $TEM_{00}$ mode unstable and the higher order transverse modes easily excited in intra-cavity frequency-doubled microchip lasers. The above described drawbacks in the intra-cavity frequency-doubled microchip lasers result in low manufacturing yield, narrow operation temperature ranges, and narrow output power range for operating in $TEM_{00}$ mode in this type of lasers.

There is therefore a need to increase manufacturing yield and to expand temperature and power ranges for the operation of $TEM_{00}$ mode in microchip lasers.

SUMMARY OF THE INVENTION

The present patent application discloses improved microchip lasers that can increase the operation ranges for the $TEM_{00}$ mode while suppressing higher order transverse modes. The $TEM_{00}$ mode can be operated over much wider temperature and output power ranges compared to conventional microchip lasers. The disclosed methods and devices are easy to implement, which allows efficient mass production of intra-cavity microchip lasers at low Cost.

In a general aspect, the present invention relates to a method for making a microchip laser, comprising the steps of preparing a laser-cavity chip assembly comprising a gain media configured to produce a lasing light at a fundamental frequency in response to a pump light, wherein the laser-cavity chip assembly includes a first substantially flat surface and a second substantially flat surface parallel to the first substantially flat surface; forming a first reflective film on the first substantially flat surface of the laser-cavity chip assembly to form a first cavity mirror; forming a second reflective film on the second substantially flat surface of the laser-cavity chip assembly to form a second cavity mirror; and patterning at least one of the first reflective film or the second reflective film by removing at least a portion of the reflective film in the outer portion to form a center reflective portion in the one of the first reflective film or the second reflective film, wherein the first cavity mirror and the second cavity mirror are configured to suppress higher order transverse modes and to substantially produce a single $TEM_{00}$ mode in the lasing light.

Implementations of the system may include one or more of the following. The step of patterning can include forming grooves in the outer portion in the one of the first reflective film or the second reflective film to define the center reflective portion. The step of patterning can include cutting grooves by a dicing saw in the outer portion in the one of the first reflective film or the second reflective film to define the center reflective portion. The center reflective portion can have a substantially rectangle shape defined by four substantially straight grooves. The center reflective portion can have a substantially round shape defined by a circular groove. The groove can have a width between 50 μm and 200 μm and a depth between 4 μm and 10 μm. Substantially all the outer portion of the one of the first reflective film or the second reflective film can be removed. At least a portion of the outer portion of the one of the first reflective film or the second reflective film can be removed by lithographic patterning, masking, and etching. The step of preparing a laser-cavity chip assembly can include bonding a frequency-doubling material to the gain media. The step of preparing a laser-cavity chip assembly can include bonding a quarter waveplate to the frequency-doubling material or the gain media.

In another general aspect, the present invention relates to a microchip laser device, that includes a laser-cavity chip assembly comprising a gain media, wherein the laser-cavity chip assembly can include a first substantially flat surface and a second substantially flat surface parallel to the first substantially flat surface, wherein the gain media is configured to produce a lasing light at a fundamental frequency in response to a pump light; a first cavity mirror that includes a first reflective film coated on the first substantially flat surface of the laser-cavity chip assembly; and a second cavity mirror comprising a second reflective film coated on the second substantially flat surface of the laser-cavity chip assembly, wherein the first cavity mirror and the second cavity mirror define a laser cavity, wherein the first reflective film includes a center reflective portion and an outer portion surrounding the center reflective portion, wherein at least a portion of the first reflective film is removed in the outer portion, wherein the first cavity mirror can suppress higher order transverse modes and to substantially produce a single $TEM_{00}$ mode in the lasing light.

Implementations of the system may include one or more of the following. The outer portion in the first reflective film can include grooves defining the center reflective portion. The center reflective portion can have a substantially rectangle shape defined by four substantially straight grooves. The center reflective portion can have a substantially round shape defined by a circular groove. The groove can have a width between 25 μm and 100 μm and a depth between 4 μm and 10 μm. Substantially all the first reflective film in the outer portion can be removed. The laser-cavity chip assembly can include a frequency-doubling material bonded to the gain media. The laser-cavity chip assembly comprises can further include a quarter waveplate bonded to the frequency-doubling material or the gain media. The first cavity mirror can produce the lasing light substantially in a single $TEM_{00}$ mode at an output power below 0.1 mW. The first cavity mirror can produce the lasing light substantially in a single $TEM_{00}$ mode in a temperature range of 80° C. The first cavity mirror can produce the lasing light substantially in a single $TEM_{00}$ mode with a yield higher than 65%. The first cavity mirror can produce the lasing light substantially in a single $TEM_{00}$ mode with an output power of at least 100 mW.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and form a part of the specification, illustrate embodiments of the present invention and, together with the description, serve to explain the principles of the invention.

FIG. 1A is a schematic diagram of a conventional microchip laser.

FIG. 1B is a schematic diagram of a conventional microchip laser capable of intra-cavity frequency doubling.

FIG. 5A is a magnified photograph of the quartz wave-plate having a uniform high-reflective coating layer shown in FIG. 3A.

FIG. 5B is a magnified photograph of the quartz wave-plate having a high-reflective coating layer scribed by straight grooves using a method illustrated in FIG. 3D.

DETAILED DESCRIPTION OF THE INVENTION

Figure 3:
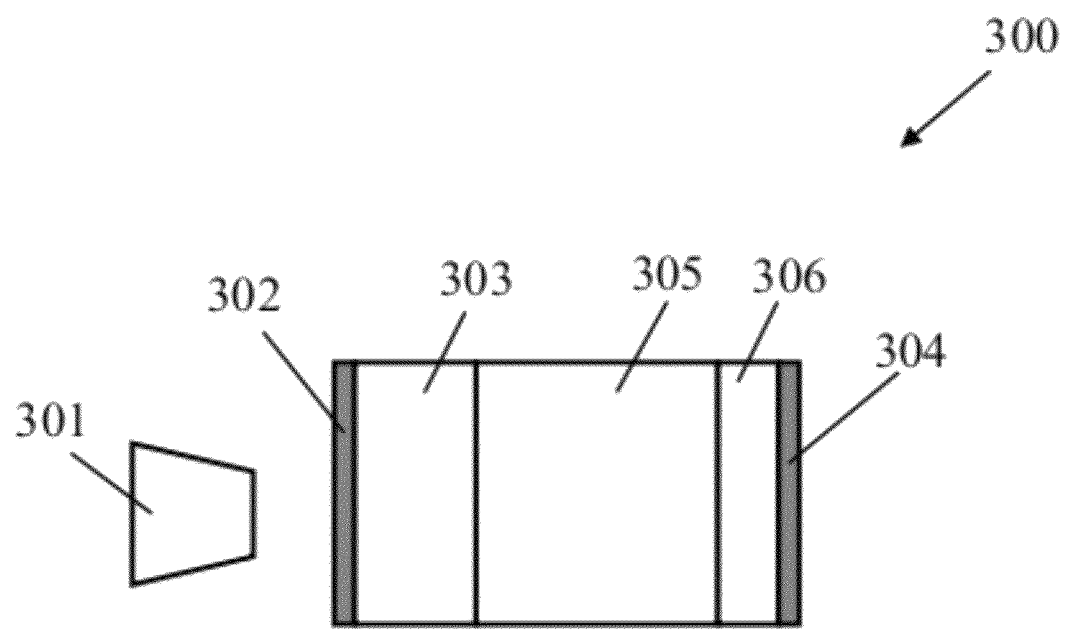
FIG. 3 is a schematic diagram of a low-noise microchip laser having intra-cavity frequency doubling compatible with the present invention.

Referring to FIG. 3, an improved microchip laser device 300 includes a gain media 303 and a frequency doubling material 305 which are bonded together to form the laser cavity. The gain material 301 and the frequency doubling material 305 both have polished and parallel surfaces. A quarter waveplate 306 for the fundamental wavelength is inserted in the cavity between the mirror 304 and the frequency doubling material 305. The gain media 303, the frequency doubling material 305, and the quarter waveplate 306 together can be called a laser cavity assembly. Patterned cavity mirrors 302, 304 are formed by reflective films coated on the outer surfaces of the gain media 303 and the quarter waveplate 306. The reflective film can for example be formed by $SiO_2/V_2O_5$. Additionally, as described below, the reflective films are patterned to suppress high order modes while stabilizing the $TEM_{00}$ mode.

Figure 3A:
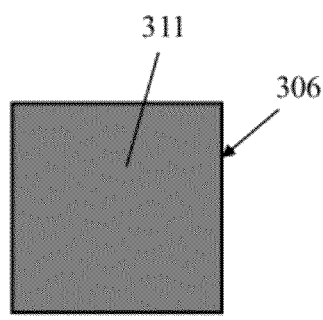
FIG. 3A shows a wave-plate coated with a uniform high-reflective layer.

The reflective films on the outer surfaces of the improved microchip laser device 300 can be etched or scribed in different patterns to form the patterned cavity mirrors 302, 304. FIGS. 3A-3D show various patterning of a high reflective film coated on the quarter waveplate 306, which can be made of quartz. FIG. 3A shows a uniform high-reflective film 311 coated on a quarter waveplate 306, wherein the high-reflective film 311 is not patterned.

Figure 3B:
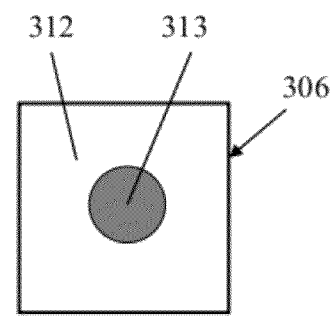
FIG. 3B shows a wave-plate coated with a high-reflective layer in the central circular region in accordance with the present invention.

FIG. 3B shows that the high-reflective film 311 in FIG. 3A being etched out using lithography to leave an etched out portion 312 and a circular patterned reflective film 313 in the center.

Figure 3C:
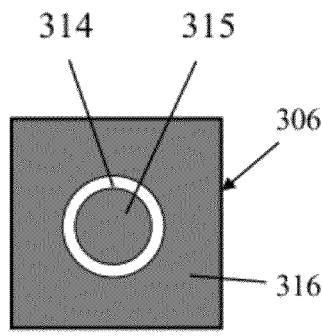
FIG. 3C shows a wave-plate coated with a high-reflective layer which is scribed by a ring groove in accordance with the present invention.

FIG. 3C shows that the high-reflective film 311 in FIG. 3A being scribed by a laser scriber to form a ring-shaped groove pattern 314 leaving a circular patterned reflective film 315 in the center and an outer reflective film 316.

Figure 3D:
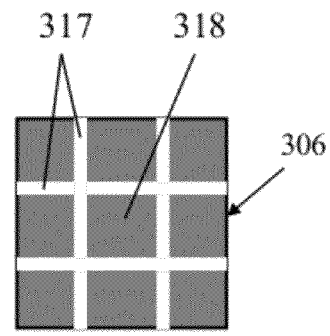
FIG. 3D shows a wave-plate coated with a high-reflective layer which is scribed by straight grooves in accordance with the present invention.

FIG. 3D shows that the high-reflective film 311 in FIG. 3A being scribed by dicing saw to form substantially straight grooves 317 leaving a center patch 318 of reflective film in the center of the quarter waveplate 306.

In operation, the frequency-doubled microchip laser 300 is pumped by a laser diode 301. The gain media 303 can produce a lasing light at a fundamental frequency in response to a pump light. A strong circulating field is built up at the fundamental frequency. The patterned cavity mirrors 302, 304 reflect light at the fundamental wavelength. As the fundamental field passes through the frequency doubling material 305, a significant portion of the fundamental light is converted to the second harmonic at the doubling frequency. The patterned cavity mirrors 302, 304 have the functions of selectively reflect laser light in $TEM_{00}$ mode with negligible loss while rendering large reflective or transmission losses for laser light in higher order transverse modes. The other words, the patterned cavity mirrors in the improved microchip laser device 300 can efficiently to suppress higher order transverse modes in laser resonance cavity.

It should be understood that the patterned cavity mirrors described in the present application can be compatible with different configurations of microchip laser devices. For example, the laser cavity assembly can have different components bonded in different sequences as described above.

For example, the gain media can be positioned between the frequency doubling material and the quarter waveplate. The outer surfaces of the laser cavity assembly are flat and parallel to each other. The cavity mirrors are formed on the outer surfaces of the laser cavity assembly. The laser cavity assembly can include only the gain media. The laser cavity assembly can also include only the gain media and the frequency doubling material.

Moreover, only one of the cavity mirrors needs to be patterned while the other cavity mirror is not patterned. Alternatively, both cavity mirrors can be patterned.

Figure 1C:
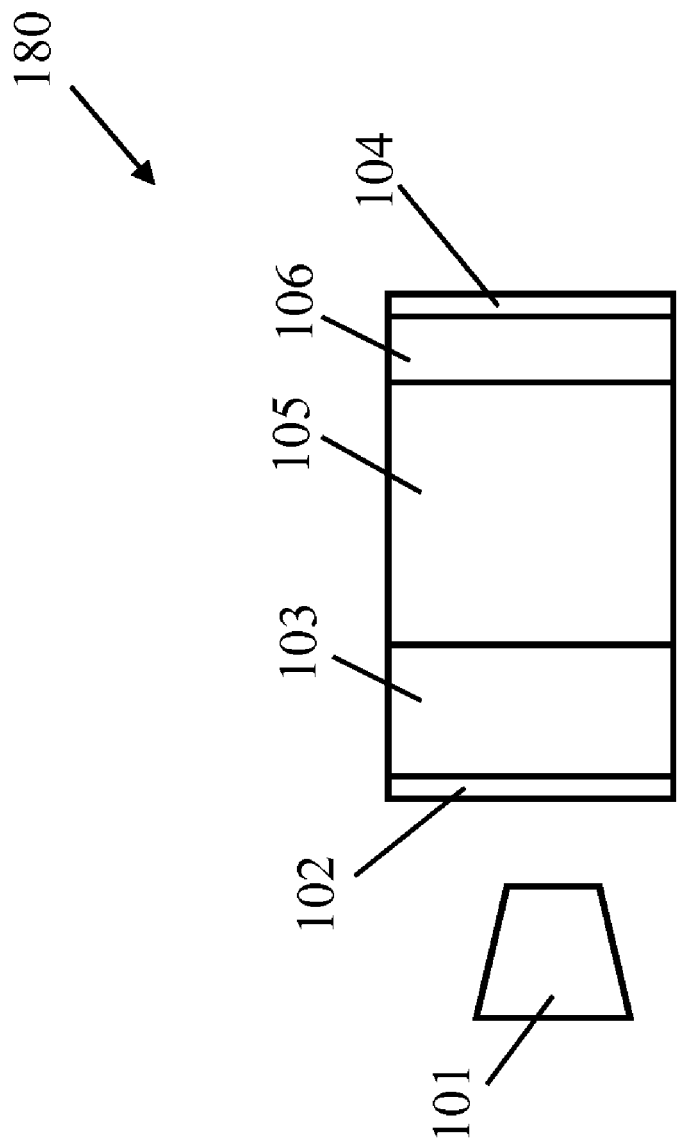
FIG. 1C is a schematic diagram of a low-noise conventional microchip laser capable of intra-cavity frequency doubling.
Figure 2A:
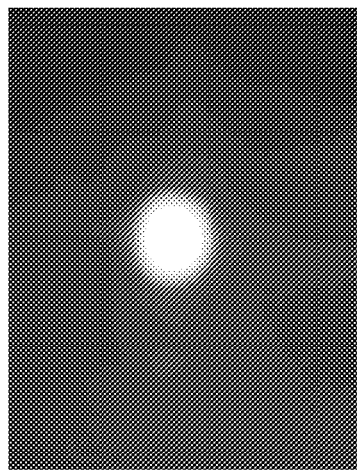
FIG. 2A shows a far-field pattern of a light beam in $TEM_{00}$ mode emitted by a conventional microchip green laser.
Figure 2B:
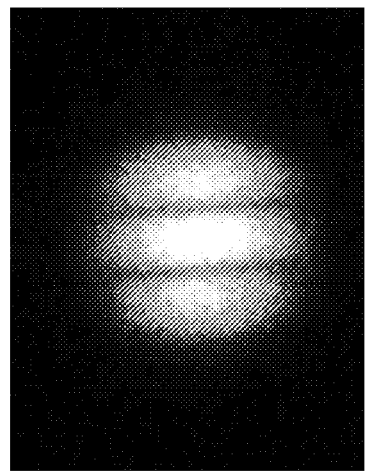
FIG. 2B shows a far-field pattern of a light beam in $TEM_{00}$ and $TEM_{01}$ modes emitted by a conventional microchip green laser.
Figure 2C:
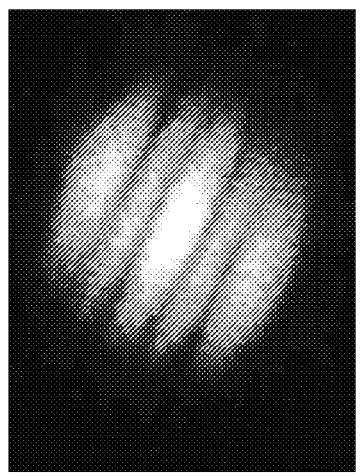
FIG. 2C shows a far-field pattern of a light beam in $TEM_{00}$, $TEM_{01}$, and $TEM_{02}$ modes emitted by a conventional microchip green laser.

Furthermore, the quarter waveplate and/or the frequency doubling material may not be present in the intra-cavity of the microchip laser. In other words, the patterned cavity mirrors can be applied to the configurations as shown in FIGS. 1A and 1B to promote $TEM_{00}$ mode and suppress higher-order transverse modes in the improved microchip lasers.

Figure 4:
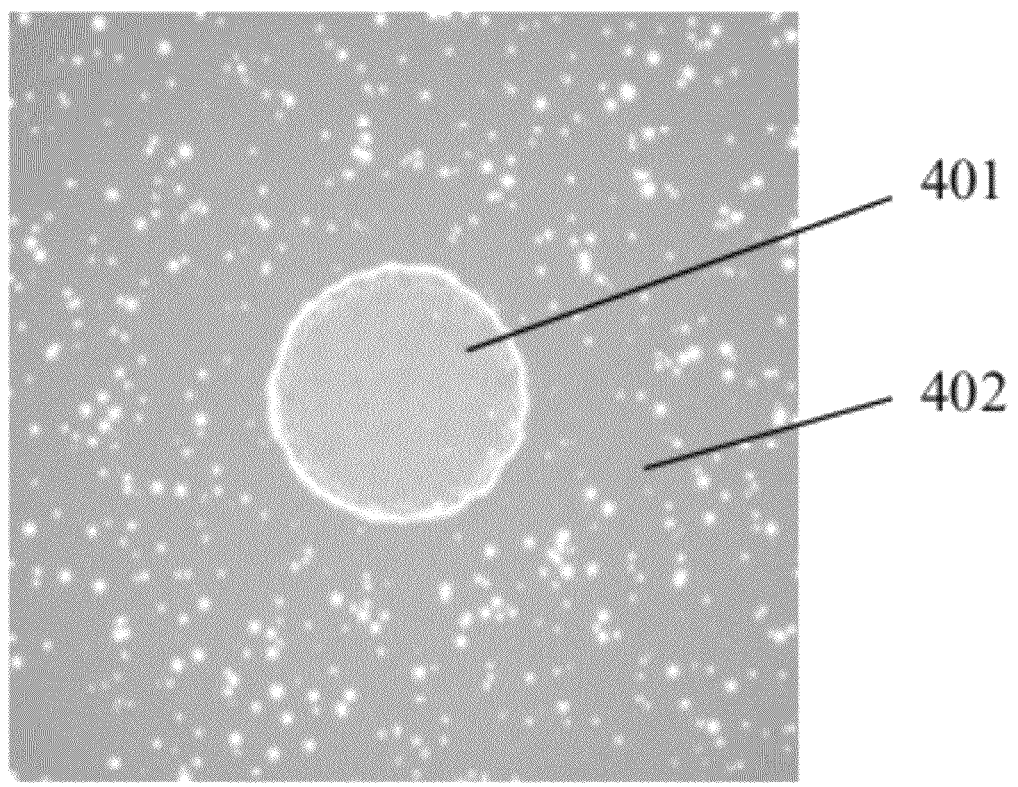
FIG. 4 is a magnified photograph of a quartz wave-plate having reflective film patterned using the method illustrated in FIG. 3B.

In some embodiments, the patterning of the patterned cavity mirrors in the improved microchip laser device can be conducted using lithographic patterning technique in semiconductor industry. FIG. 4 shows a magnified photograph of a highly reflective etched by lithography. The size of quartz plate is about 0.9×0.9 mm². Most of highly reflective film is etched out in the etched area 402, leaving a patterned cavity mirror 401 having a diameter approximately of 0.35 mm.

In semiconductor industry, typical film thickness for lithographic etching is smaller than 0.5 μm. In the present improved microchip laser device, the highly reflective film can have a thickness in a range of 4-5 μm, which requires long etching time (many hours). A high quality and durable photoresist mask is thus required to sustain the strong etching solution for many hours. The above described factors can produce complication and costs to the lithographic patterning of cavity mirrors in the presently described improved microchip laser device.

In some embodiments, a laser scriber can be used to produce patterns in the cavity mirrors in the presently described improved microchip laser device. The typical highly reflective films used in microchip lasers, however, absorb very little light at longer wavelengths (>400 nm). Only UV (<355 nm) laser scriber can be use to scribe high-reflective-film, which increases cost and decreases efficiency in this application.

In some embodiments, the highly reflective film in the cavity mirror is patterned by a dicing saw. This method is easy to implement as well as cost effective. In addition, experimental results show that this method is very efficient in suppressing higher order transverse modes in intra-cavity frequency-doubled microchip laser.

FIGS. 5A and 5B respectively show the photographs of the high reflective films on the quarter waveplate before and after it is being scribed by automatic dicing saw (available from Disco Corporation). In one implementation, two pairs of parallel grooves 502 are scribed to produce a grid pattern as shown in FIGS. 3D and 5B. The scribed grooves 502 can have a width between 50 μm and 200 μm and a depth between 4 μm and 10 μm. For example, the scribed grooves 502 can be approximately 50 μm wide and 5 μm deep. The center patch 501 in the reflective film can have an area of about 0.35×0.35 mm².

The performances of intra-cavity frequency-doubled microchip lasers have been experimentally compared between patterned and un-patterned cavity mirrors. For comparisons, a large number intra-cavity frequency-doubled microchip lasers were manufactured with patterned and un-patterned cavity mirrors. The intra-cavity frequency-doubled microchip laser devices include a 0.5 mm thick $Nd:YVO_4$ (3% Nd) as the gain medium, a 1.5 mm thick KTP as the frequency doubling material, and a 0.5 mm thick quartz as the quarter waveplate. The pump laser diode can emit pump laser beam at 808 nm at a maximum output power of 500 mW. When pumped by the laser diode pumps, the intra-cavity frequency-doubled microchip lasers emit green laser beams at 532 nm.

The waist of laser beam from a microchip laser device is dependent on its output power. In the test, the nominal output power of green beam is 3-5 mW. The diameter of spot of 1064 nm beam at output surface was measured to be about 0.2 mm. Therefore, the center patch 318 of reflective film (FIG. 3D) is selected to be 0.35-0.4 mm larger than the width of the fundamental laser beam at the cavity mirror.

Figure 6A:
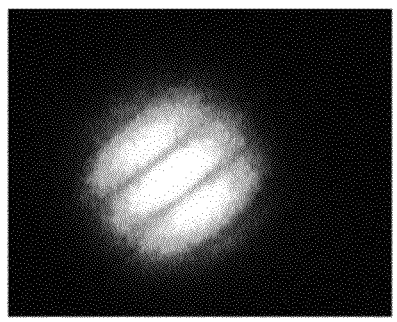
FIG. 6A shows a far-field pattern of a light beam in multi-transverse mode emitted by a conventional microchip green laser having un-patterned cavity mirrors as shown in FIGS. 3A and 5A.
Figure 6B:
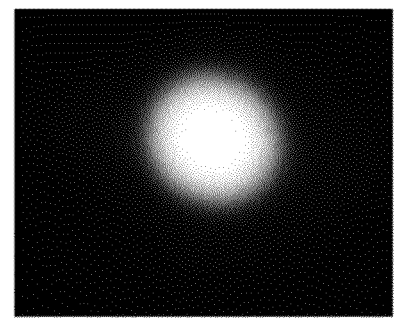
FIG. 6B shows a far-field pattern of a light beam in $TEM_{00}$ mode emitted by a microchip green laser having cavity mirror patterned using methods shown in FIGS. 3D and 5B.

It was observed that a micro chip laser device having un-patterned cavity mirrors (as shown in FIGS. 3A, 5A) produce a far field laser spot as shown in FIG. 6A, which includes multiple transverse modes. In contrast, after the high-reflective film on quartz plate of the device has been patterned by dicing saw (as shown in FIGS. 3D, 5B), the same is device produced a high quality round far field laser spot, as shown in FIG. 6B, which is $TEM_{00}$ mode. It was found that dicing saw to scribes narrow (50 μm) and shallow (5 μm) grooves on the high reflective film coated on an outer surface of the laser cavity assembly can suppress higher-order transverse modes in intra-cavity frequency-doubled microchip laser or microchip laser. The patterned reflective film can be formed on the quarter waveplate, the gain media, or the frequency doubling material (which ever is positioned providing an outer surface). The method is inexpensive and suitable for mass production.

Performance comparisons between green microchip lasers with patterned and un-patterned cavity mirrors are summarized in Table 1.

TABLE I

Performance of green microchip lasers with and without scribed patterning in the cavity mirrors

| | Green microchip lasers | |
| --- | --- | --- |
| | Un-patterned cavity mirrors | Patterned cavity mirrors |
| Yield | <10% | >65% |
| Temperature range[1] | 30° C. | >80° C.[2] |
| Minimum output power[3] | 3 mW | ≈0 |
| Maximum output power[4] | | 160 mW |

[1][3]$TEM_{00}$ mode green output;
[2]limited by the temperature control range of the test system;
[4]500 mW (808 nm) laser diode pumping and $TEM_{00}$ mode green output.

An exemplified microchip laser application includes the following requirements: 1) $TEM_{00}$ mode output; 2) 3-5 mW green output power and 3) 0-45° C. working temperature range. It was found in our experiments that the yields of the green microchip lasers with un-patterned cavity mirrors were less than 10%. The yields of the green microchip lasers with patterned cavity mirrors were increased up to higher than 65%, an increase of 6 times in yields.

As above mentioned, conventional microchip lasers operate in multi-transverse modes at low output power and low pump power. For the green lasers with un-patterned cavity mirrors, the minimum output power to establish a single $TEM_{00}$ mode is 3 mW, above which thermal lensing effect can stabilize the single $TEM_{00}$ mode. For the green lasers with patterned cavity mirrors, this minimum output power is reduced down to close to 0 mW. For example, the minimum output power is less than 0.1 mW. This shows that the patterned cavity mirrors can define a stable cavity at low output power similar to thermal lensing effects at high pump power in conventional microchip lasers.

When pump power is increased to 500 mW (maximum for this experiment), the maximum $TEM_{00}$ mode green output power from green lasers with the patterned cavity mirrors is 160 mW. At this output level the diameter of the fundamental laser beam (1064 nm) at output surface is about 0.13 mm. Although the designed nominal $TEM_{00}$ mode green output power is 5 mW, the dynamic range for the output power is very wide. It was found that the dynamic range for the output power can reach 300 mW at a pump power of 1 W while maintaining the $TEM_{00}$ mode in the output.

Conventional microchip laser can operate in $TEM_{00}$ mode only in very limited temperature range. For conventional green microchip lasers, this working temperature range is particularly narrow. The average working temperature range in $TEM_{00}$ mode for the green laser with un-patterned cavity mirrors is less than 30° C. A wider working temperature range means a trade-off that decreases yield to almost zero. In contrast, the green lasers with patterned cavity mirrors can operate in $TEM_{00}$ mode from −10° C. to +70° C., which is limited by the range of temperature control by the test system used in our experiments. The operating temperature range can be at least 80° C., which is wider than conventional microchip laser devices.

The patterning of cavity mirrors can slightly increase mode loss for $TEM_{00}$ mode. At the same green output power in a single $TEM_{00}$ mode, the driving current of pump laser diode needs to be about 15% higher than that for the green microchip laser with un-patterned cavity mirrors.

It should be understood that the described improved microchip laser can be implemented in other configurations without deviating from the spirit of the present invention. For example, the improved microchip laser can include the frequency doubling material in the cavity or without it. Different materials can be used for the gain media, the frequency doubling material, and the quarter waveplate from the examples described above. The improved microchip laser can also have different dimensions. The grooves in the cavity mirrors can be scribed in different widths and depths. The center patch of reflective film can have different areas without deviating from the spirit of the present invention.

What is claimed is:

1. A method for making a microchip laser, comprising:
    bonding a gain media, a frequency doubling material, and a quarter waveplate to form a laser-cavity chip assembly, wherein the gain media is configured to produce a fundamental lasing light at a fundamental frequency in response to a pump light, wherein the frequency doubling material is configured to convert the fundamental lasing light to a frequency-doubled lasing light, wherein the gain media has a first substantially flat surface, wherein the quarter waveplate has a second substantially flat surface parallel to the first substantially flat surface;
    forming a first reflective film on the first substantially flat surface of the gain media to form a first cavity mirror;
    forming a second reflective film on the second substantially flat surface of the quarter waveplate to form a second cavity mirror; and
    cutting, with a dicing saw, a first pair of parallel grooves across a full length of the second reflective film along a first direction;
    cutting, with the dicing saw, a second pair of parallel grooves across a full width of the second reflective film along a second direction, wherein the first pair of parallel grooves intercept with the second pair of parallel grooves to define a center reflective portion configured to suppress higher order transverse modes in the frequency-doubled lasing light and to substantially produce a single $TEM_{00}$ mode in the frequency-doubled lasing light.

2. The method of claim 1, wherein the frequency doubling material is inserted between the gain media and the quarter waveplate.

3. The method of claim 1, wherein the first pair of parallel grooves and the second pair of parallel grooves are cut in the second reflective film to define a center reflective portion in the second reflective film.

4. The method of claim 1, wherein the first pair of parallel grooves are substantially perpendicular to the second pair of parallel grooves which defines a center reflective portion.

5. The method of claim 4, wherein the center reflective portion has a substantially square shape defined by the two pairs of parallel grooves.

6. The method of claim 1, wherein each of the first pair of parallel grooves and the second pair of parallel grooves has a width between 50 μm and 200 μm.

7. The method of claim 1, wherein each of the first pair of parallel grooves and the second pair of parallel grooves has depths between 4 μm and 10 μm.

8. The method of claim 1, wherein the center reflective portion has a width 0.35-0.4 mm wider than the fundamental lasing light.

9. The method of claim 1, wherein the laser cavity is configured to produce the frequency-doubled lasing light substantially in a single $TEM_{00}$ mode in a temperature range of 80° C.

10. The method of claim 1, wherein the laser cavity is configured to produce the frequency-doubled lasing light substantially in a single $TEM_{00}$ mode with a yield higher than 65%.

11. The method of claim 1, wherein the frequency-doubled lasing light is in the green wavelength range.

12. A microchip laser device, comprising:
a laser-cavity chip assembly comprising a gain media, a frequency doubling material, and a quarter waveplate, wherein the gain media is configured to produce a fundamental lasing light at a fundamental frequency in response to a pump light, wherein the frequency doubling material is configured to convert the fundamental lasing light to a frequency-doubled lasing light, wherein the gain media has a first substantially flat surface, wherein the quarter waveplate has a second substantially flat surface parallel to the first substantially flat surface;
a first cavity mirror comprising a first reflective film coated on the first substantially flat surface of the gain media; and
a second cavity mirror comprising a second reflective film coated on the second substantially flat surface of the quarter waveplate, wherein the first cavity mirror and the second cavity mirror define a laser cavity, wherein the second reflective film includes two pairs of parallel grooves each across a full width of the second cavity mirror, wherein the two pairs of parallel grooves intercept with each other and define a center reflective portion, wherein the first cavity mirror and the second cavity mirror are configured to suppress higher order transverse modes in the frequency-doubled lasing light and to substantially produce a single $TEM_{00}$ mode in the frequency-doubled lasing light.

13. The microchip laser device of claim 12, wherein the first reflective film includes two pairs of parallel grooves that intercept with each other to define a center reflective portion in the first reflective film.

14. The microchip laser device of claim 12, wherein the two pairs of parallel grooves are substantially perpendicular to each other.

15. The microchip laser device of claim 13, wherein the center reflective portion has a substantially square shape defined by the two pairs of parallel grooves.

16. The microchip laser device of claim 12, wherein each of the first pair of parallel grooves has a width between 50 μm and 200 μm.

17. The microchip laser device of claim 12, wherein the first pair of parallel grooves and the second pair of parallel grooves have depths between 4 μm and 10 μm.

18. The microchip laser device of claim 12, wherein the center reflective portion has a width 0.35-0.4 mm larger than a width of the fundamental lasing light.

19. The microchip laser device of claim 12, wherein the two pairs of parallel grooves define a grid pattern that defines the center reflective portion.

20. The microchip laser device of claim 12, wherein the laser cavity is configured to produce the frequency-doubled lasing light substantially in a single $TEM_{00}$ mode in a temperature range of 80° C.

21. The microchip laser device of claim 12, wherein the laser cavity is configured to produce the frequency-doubled lasing light substantially in a single $TEM_{00}$ mode with a yield higher than 65%.

22. The microchip laser device of claim 12, wherein the frequency-doubled lasing light is in the green wavelength range.

* * * * *